(12) United States Patent
Wiley et al.

(10) Patent No.: US 8,935,177 B2
(45) Date of Patent: Jan. 13, 2015

(54) METHOD AND SYSTEM FOR ANONYMOUS MEASUREMENT OF ONLINE ADVERTISEMENT USING OFFLINE SALES

(75) Inventors: Shane Wiley, Laveen, AZ (US); Amir Cory, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 653 days.

(21) Appl. No.: 12/976,482

(22) Filed: Dec. 22, 2010

(65) Prior Publication Data

US 2012/0166272 A1 Jun. 28, 2012

(51) Int. Cl.
*G06Q 30/00* (2012.01)
*G06Q 30/02* (2012.01)

(52) U.S. Cl.
CPC .................. *G06Q 30/0246* (2013.01)
USPC ...................... 705/14.4; 705/14.41

(58) Field of Classification Search
None
See application file for complete search history.

(56) References Cited

U.S. PATENT DOCUMENTS

| | | | | |
|---|---|---|---|---|
| 6,298,330 | B1 * | 10/2001 | Gardenswartz et al. | ... 705/14.25 |
| 6,317,745 | B1 * | 11/2001 | Thomas et al. | ......... 1/1 |
| 7,769,868 | B2 * | 8/2010 | Mishra et al. | ........ 709/227 |
| 8,060,402 | B1 * | 11/2011 | Ranganath et al. | ....... 705/14.73 |
| 2001/0027564 | A1 * | 10/2001 | Cowan et al. | .......... 725/146 |
| 2003/0037131 | A1 * | 2/2003 | Verma | ............ 709/223 |
| 2003/0130951 | A1 * | 7/2003 | Chess et al. | ........ 705/50 |
| 2003/0145203 | A1 * | 7/2003 | Audebert et al. | .......... 713/169 |
| 2004/0024632 | A1 * | 2/2004 | Perry | ............... 705/10 |
| 2005/0154887 | A1 * | 7/2005 | Birk et al. | ........... 713/168 |
| 2005/0251691 | A1 * | 11/2005 | Haufe | ............ 713/189 |
| 2006/0168223 | A1 * | 7/2006 | Mishra et al. | ........... 709/225 |
| 2007/0067297 | A1 * | 3/2007 | Kublickis | ........... 707/9 |
| 2008/0271090 | A1 * | 10/2008 | Fortunato | ......... 725/67 |
| 2008/0294559 | A1 * | 11/2008 | Wield et al. | ........... 705/50 |
| 2009/0083442 | A1 * | 3/2009 | Sutter et al. | ........... 709/248 |
| 2010/0020752 | A1 * | 1/2010 | Anschutz et al. | .......... 370/328 |
| 2010/0145791 | A1 * | 6/2010 | Canning et al. | ........... 705/14.41 |
| 2010/0217982 | A1 * | 8/2010 | Brown et al. | ............ 713/168 |
| 2010/0218229 | A1 * | 8/2010 | Lee et al. | ........ 725/112 |
| 2010/0313009 | A1 * | 12/2010 | Combet et al. | .......... 713/150 |
| 2011/0010425 | A1 * | 1/2011 | Bernatz | ............ 709/206 |
| 2011/0030046 | A1 * | 2/2011 | Shemenski et al. | ............. 726/9 |
| 2011/0258064 | A1 * | 10/2011 | Agarwal et al. | ........... 705/26.1 |
| 2012/0005023 | A1 * | 1/2012 | Graff | .......... 705/14.58 |
| 2012/0054022 | A1 * | 3/2012 | Kosashvili | ........... 705/14.43 |
| 2012/0109734 | A1 * | 5/2012 | Fordyce et al. | ........... 705/14.25 |
| 2012/0124206 | A1 * | 5/2012 | Butler et al. | ........... 709/224 |
| 2012/0136708 | A1 * | 5/2012 | Chang et al. | ............ 705/14.23 |

\* cited by examiner

*Primary Examiner* — Matthew T Sittner
(74) *Attorney, Agent, or Firm* — James J. DeCarlo; Greenberg Traurig, LLP (57) ABSTRACT

Anonymous measurement of online advertising using offline sales is disclosed. The measurement uses anonymized online ad exposure data and anonymized offline sales, or conversion data, to measure effectiveness of online advertisement. The anonymized exposure and conversion data are matched using tokens from each data set; each token corresponds to a user and is generated from personally identifiable information of the user that is anonymized to preserve the user's privacy. The anonymized exposure and conversion data is aggregated using the tokens to map records in the data sets for a given user. Users' ad exposure and sales history is used, anonymously, to gauge ad effectiveness of a corresponding ad campaign. The effectiveness measure, or measures, can further be used to configure another ad campaign.

19 Claims, 7 Drawing Sheets

METHOD AND SYSTEM FOR ANONYMOUS MEASUREMENT OF ONLINE ADVERTISEMENT USING OFFLINE SALES

FIELD OF THE DISCLOSURE

The present disclosure relates to privacy protection in measurement of online advertising campaigns, and more particularly to measuring effectiveness of online advertisement on offline sales in a privacy protective manner.

BACKGROUND

A significant barrier to shifting advertisement budgets to the online channel is the inability to measure the effectiveness and/or impact of an online advertisement campaign on offline sales, e.g., brick and mortar sales. Measurement, or metrics, that have been used for online campaigns are typically based on click through rate (CTR), surveys or offline impact analysis based on a panel of users. Missing in the measurement of online advertisement effectiveness is data from offline sales. Since a significant percentage, e.g., approximately 95%, of the total commerce in the United States, is derived from offline sales, it would be beneficial to be able to make use of data from offline sales to determine the effectiveness of online advertising, and to measure causality between exposure to an online display ad and an offline sales event(s).

SUMMARY

The present disclosure addresses these and other needs. By way of a non-limiting introduction, the present disclosure comprises measurement of online ad effectiveness that uses anonymized online ad exposure data and anonymized offline sales, or conversion, data to measure effectiveness of online advertisement. The anonymized exposure and conversion data are matched using tokens from each data set; each token corresponds to a user and is generated from personally identifiable information of the user that is anonymized to preserve the user's privacy. The anonymized exposure and conversion data is aggregated using the tokens to map records in the data sets for a given user. Users' ad exposure and sales history can be used, anonymously, to gauge ad effectiveness. The effectiveness measure, or measures, can be used to configure another ad campaign, including setting a budget for online advertising.

In one aspect, a method is provided by at least one computing device that maintains a user data store for each of a plurality of users, each user data store storing personally identifiable information about a corresponding user, the corresponding user's personally identifiable information being associated with a unique identifier that uniquely identifies the user in ad tracking data; collects the ad tracking data for each advertisement served to the plurality of users in connection with an online advertisement campaign; generates exposure data using the ad tracking data, the exposure data including at least a portion of the personally identifiable information for each user of the plurality; causes a unique first token to be generated using a first identifier associated with the personally identifiable information included in the exposure data for each user of the plurality, each unique first token being a first level of abstraction of the corresponding user's personally identifiable information included in the exposure data and uniquely identifying the corresponding user; causes a unique second token to be generated using a second identifier associated with the personally identifiable information included in the exposure data for each user of the plurality, each unique second token being a second level of abstraction of the corresponding user's personally identifiable information included in the exposure data and uniquely identifying the corresponding user; and causes each user's personally identifiable information in the exposure data to be replaced with the user's corresponding unique second token, the unique second token used to identify the corresponding user's exposure to the online ad campaign and to identify sales transactions of the corresponding user in offline sales transaction data in measuring effectiveness of the online advertisement campaign using the exposure and offline sales transaction data.

In another aspect, a system is provided, the system comprises at least one processor executing and memory storing instructions to maintain a user data store for each of a plurality of users, each user data store storing personally identifiable information about a corresponding user, the corresponding user's personally identifiable information being associated with a unique identifier that uniquely identifies the user in ad tracking data; collect the ad tracking data for each advertisement served to the plurality of users in connection with an online advertisement campaign; generate exposure data using the ad tracking data, the exposure data including at least a portion of the personally identifiable information for each user of the plurality; cause a unique first token to be generated using a first identifier associated with the personally identifiable information included in the exposure data for each user of the plurality, each unique first token being a first level of abstraction of the corresponding user's personally identifiable information included in the exposure data and uniquely identifying the corresponding user; cause a unique second token to be generated using a second identifier associated with the personally identifiable information included in the exposure data for each user of the plurality, each unique second token being a second level of abstraction of the corresponding user's personally identifiable information included in the exposure data and uniquely identifying the corresponding user; and cause each user's personally identifiable information in the exposure data to be replaced with the user's corresponding unique second token, the unique second token used to identify the corresponding user's exposure to the online ad campaign and to identify sales transactions of the corresponding user in offline sales transaction data in measuring effectiveness of the online advertisement campaign using the exposure and offline sales transaction data.

In yet another aspect, a computer readable storage medium for tangibly storing thereon computer readable instructions that when executed cause at least one processor to maintain a user data store for each of a plurality of users, each user data store storing personally identifiable information about a corresponding user, the corresponding user's personally identifiable information being associated with a unique identifier that uniquely identifies the user in ad tracking data; collect the ad tracking data for each advertisement served to the plurality of users in connection with an online advertisement campaign; generate exposure data using the ad tracking data, the exposure data including at least a portion of the personally identifiable information for each user of the plurality; cause a unique first token to be generated using a first identifier associated with the personally identifiable information included in the exposure data for each user of the plurality, each unique first token being a first level of abstraction of the corresponding user's personally identifiable information included in the exposure data and uniquely identifying the corresponding user; cause a unique second token to be generated using a second identifier associated with the personally identifiable information included in the exposure data for each user of the plurality, each unique second token being a second level of abstraction of the corresponding user's personally identifiable information included in the exposure data and uniquely identifying the corresponding user; and cause each user's personally identifiable information in the exposure data to be replaced with the user's corresponding unique second token, the unique second token used to identify the corresponding user's exposure to the online ad campaign and to identify sales transactions of the corresponding user in offline sales transaction data in measuring effectiveness of the online advertisement campaign using the exposure and offline sales transaction data.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In general, the present disclosure includes an online advertisement measurement system, method and architecture. Certain embodiments of the present disclosure will now be discussed with reference to the aforementioned figures, wherein like reference numerals refer to like components.

In accordance with one or more embodiments, effectiveness of an online advertisement campaign, which comprises one or more advertisements, is measured using offline sales transactions data. In accordance with one or more embodiments, effectiveness is determined using anonymized online ad exposure data and anonymized offline sales, or conversion, data. The anonymized exposure and conversion data are matched using tokens from each data set; each token corresponds to a user and is anonymized for the user. The anonymized exposure and conversion data are aggregated using the tokens, and are used to identify a level of a user's exposure, e.g., whether or not the user is exposed, to the online advertisement(s) and a user's purchase history, e.g., sales transactions of the good and/or service being advertised. Users' online ad exposure and offline sales history can be analyzed and used, anonymously, to gauge ad effectiveness. The effectiveness measure, or measures, can be used to configure another ad campaign.

To maintain privacy and provide anonymity, personally identifiable information (PII), or information that can be used to identify a user, is anonymized and the anonymized data is used in the exposure and conversion data, in place of the PII, to represent the user. In accordance with one or more embodiments, an identifier that is associated with the PII for a user is converted to a token that is used to match the user's exposure data to the user's conversion data.

PII can comprise identification information, such as without limitation, a user identifier, or UID, name, address, age, gender, etc. PII can be collected together with online ad activity by an online data aggregator, such as for example, an online entity with a capability to create an account for a user, or otherwise collect user identification information, and associate online ad tracking data for the user, such as and without limitation, ad views, ad clicks, etc. In accordance with one or more embodiments, the online entity maintains the UID that uniquely identifies the user and associates the UID with the user's PII. Exposure data can comprise ad tracking data, e.g., ad views, ad clicks, etc., aggregated ad tracking data, e.g., total number of ad views accumulated from individual ad views, total ad clicks determined from individual ad clicks, etc. Information about the specific online ad campaign can be included with the exposure data as well. Prior to anonymization, the exposure data can include PII information for users whose ad tracking data is represented in the exposure data. The PII information for users is replaced in the exposure data with a token representing the user. In accordance with one or more embodiments, the token is generated using an identifier linked to, or associated with, the user's PII, or portion thereof.

In accordance with one or more embodiments, the identifier, e.g., UID, which is associated with a user's PII, or portion thereof, corresponding to the exposure data undergoes a first level of abstraction, to generate a first token. Using the user identifier, or UID, assigned by an online aggregator or publisher, e.g., Yahoo!® Inc., as a non-limiting example, the UID for each user from the exposure data is anonymized, or converted, to an anonymous UID, as a first token, using a first token generator. By way of a non-limiting example, the first token generator can comprise an encryption module that encrypts the UID linked to, or associated with, the PII, or portion thereof, to generate the first token. In accordance with one or more embodiments, the first token is generated by a first trusted third party, e.g., a marketing services provider such as without limitation a credit services entity or other entity that maintains or has access to consumer information, using the first token generator in response to a request by the online publisher/aggregator. Using the UID example to further illustrate, in accordance with one or more embodiments, in further response to the request the UID undergoes another conversion to generate a second token using a second token generator. By way of a non-limiting example, the second token generator uses encryption to generate the second token using and identifier linked to, or associated with, the PII, or portion thereof. In accordance with one or more embodiments, the second token generator module is provided by a second trusted third party.

In accordance with one or more embodiments, an identifier associated with the PII is used to generate the first and second tokens. The identifier used by the first trusted third party to generate the first token is the UID. The first trusted third party uses the second trusted third party's encryption to generate the second token using the first token as the identifier associated with the PII used to generate the second token. The first trusted third party maintains a mapping between the first token, the second token and the PII. The first trusted third party's mapping can be used to match the PII of a sales transaction in the conversion data with the second token.

In accordance with one or more embodiments, the conversion data comprises sales transaction data collected by an offline sales entity, e.g., a retailer with brick and mortar sales locations, from offline and online sales transactions, such as sales transactions involving the advertised good, service, product, product line, etc., that occur at a retailer's brick and mortar store. While embodiments may be described with respect to offline sales transactions, it should be apparent that online sales transactions can be also be used with the offline sales transactions in measuring effectiveness of the online advertising campaign. Each transaction includes PII identifying the user, or customer, involved in the sales transaction. In accordance with one or more embodiments, an identifier linked to, or otherwise associated with, the user's PII from the transaction is converted to the second token using a second token generator. The user's PII in the conversion data is replaced by the second token in the conversion data set. As previously discussed, the second token generator, which can be provided by the second trusted third party, uses encryption to generate the second token using the identifier linked to, or associated with, the PII, or portion thereof. In accordance with one or more embodiments, the user's second token generated from the identifier associated with the PII in the exposure data matches the user's second token generated from the identifier linked to, or associated with, PII in the conversion data.

The anonymized exposure and conversion data is aggregated and used to measure effectiveness of an online advertisement campaign comprising one or more online advertisements, or ads. The tokens in the anonymized exposure and conversion data are used to correlate user data from the two data sets. By way of a non-limiting example, token "001" representing one user can be used to identify data in the exposure data and/or the conversion data for the user represented by token "001". In accordance with one or more embodiments, the exposure and conversion data can be used to create sample user populations. A control population comprises users that have not been exposed to the online ad campaign, and the test population comprises users that have been exposed to the online ad campaign. One or more metrics, e.g., conversion, retention, return on investment metrics, can be determined using the test and/or control populations and the one or more metrics can be used to measure the effectiveness of the online advertisement campaign.

Figure 1:
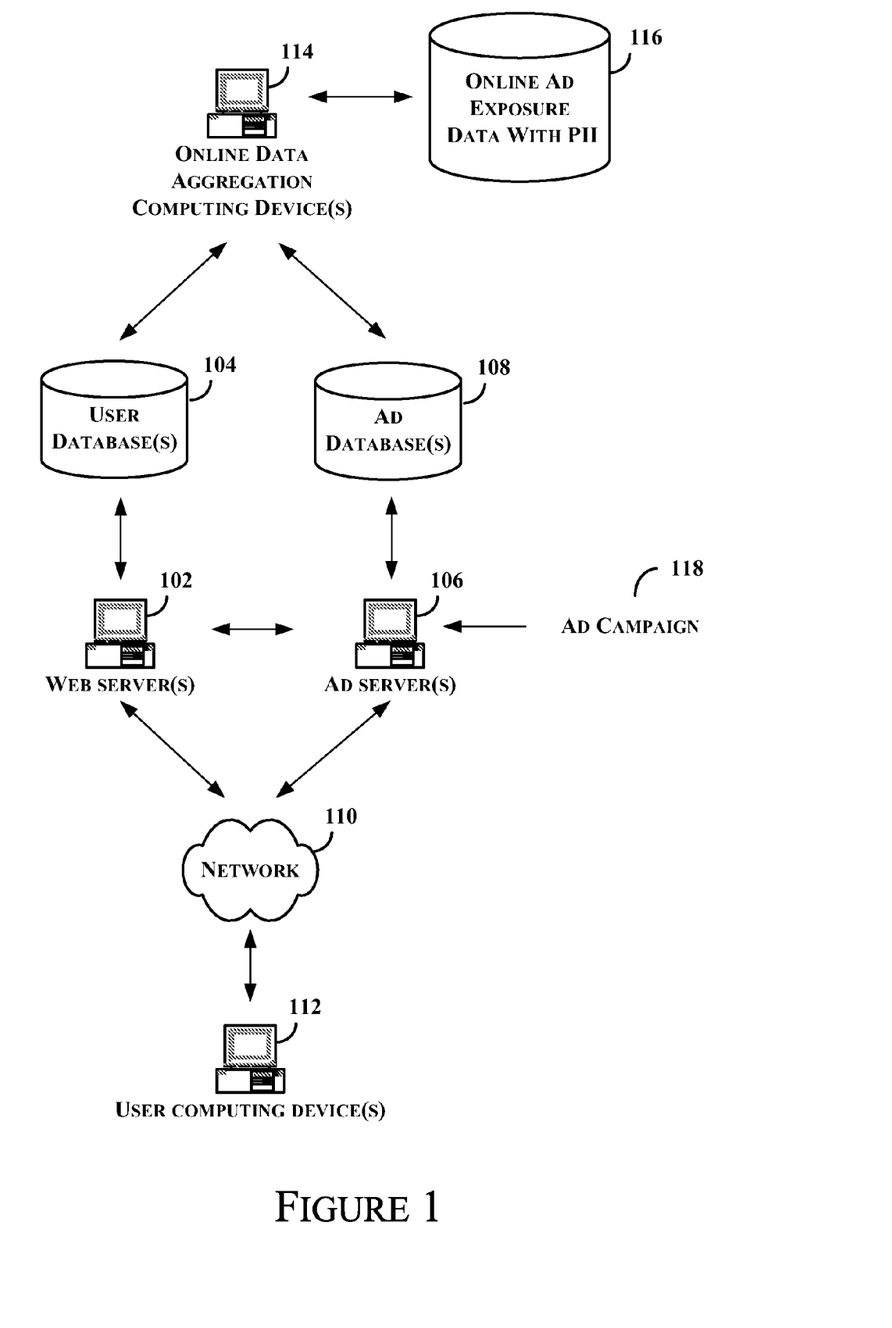
FIG. 1 provides an example of online advertising using computing devices in accordance with one or more embodiments of the present disclosure.

FIG. 1 provides an example of online advertising using computing devices in accordance with one or more embodiments of the present disclosure.

User computing device 112 can receive one or more web pages served by web server 102 to user computing device 112 via network 110. A web page received by user computing device 112 can be displayed by computing device 112, e.g., using a web browser executing on the user computing device 112. The web page can include one or more advertisements served by ad server 106 in accordance with parameters, or specifications, of the ad campaign, e.g., advertisement content or creative, targeting information, placement and size of advertisement within web page, time period(s) (e.g., start time, end time, duration of the campaign, time(s) of day, day(s) of the week, week(s) of the month, etc.), targeting data to be collected, etc. The ad campaign can include one or more advertisements for a given good, service, product, product line, etc. Ad database comprises information such as the ad campaign 118 and ad tracking data, and the identifier, e.g., the unique identifier used to generate the first token, which is associated with the PII.

Ad server 106 can serve one or more advertisements for a web page to the web server 102 for the web server 102 to serve to computing device. Alternatively, the web page can include code, e.g., hypertext markup language and/or scripting language code, to request one or more advertisements for display with the web page at the user computing device 102. The request can be made to the ad server 106, or alternatively to the web server 102, to retrieve the one or more advertisements from ad server 106, e.g., via ad database 108. The ad server 106 retrieves the one or more advertisements in accordance with the ad campaign 118. The one or more advertisements are served by ad server 106, or web server 102, via network 110 to computing device 112.

Tracking data, e.g., ad view, ad click (click through) data, is collected for the one or more advertisements. The tracking data can be received by ad server 106, or web server 102, and collected by ad server 106 in ad database 108. For each of the one or more advertisements, the tracking data can include information that identifies the advertisement, the time of an ad view and/or ad click through, size (e.g., in pixel) and/or placement of the advertisement in the web page, whether or not the view is the first one for the user, etc., and PII information of the user, e.g., from user database 104. The PII can comprise the user's UID generated by an online entity, e.g., Yahoo!® Inc., for the user registered with the online entity.

By way of one non-limiting example, some portion of the PII information can be stored in a cookie, or other data structure, at the user computing device 112, or otherwise provided by web server 102 from user database 104. User database 104 can include the UID as well as some or all of the user's PII information maintained by one or more entities, including the online entity that registered the user. PII can include information collected for the user at registration as well as other information collected from the user's online activities, e.g., page view(s), web search(es), social interaction(s), etc.

Databases 104, 108 and 116 are shown separately. It should be apparent that any combination of databases 104, 108 and 116 is contemplated without departing from the scope of embodiments of the present disclosure. Similarly, any combination of servers 102, 106 and 114 is contemplated without departing from the scope of embodiments of the present disclosure. In accordance with one or more embodiments, the same or different online entity can provide any of databases 104, 108 and 116 and servers 102, 106 and 114.

Online data aggregation device 114 generates online ad exposure data 116. Online ad exposure data 116 includes some or all of user PII. In accordance with one or more embodiments, device 114 accesses one or both of user database 104 and ad database 108 to generate online exposure data 116. In accordance with one or more such embodiments, in addition to PII, data 116 can include information from ad campaign 118, e.g., ad and/or ad campaign identification information, ad tracking data, etc. The data 116 can include the data specified by the ad campaign 118. The ad tracking data can be at any level of aggregation, e.g., token level, token grouping level, ad, or line, level, ad grouping level, ad campaign level. By way of a non-limiting example, the ad tracking data can include information that identifies the number of views of an ad, or group of ads, by a user, group of users, all or any combination of the users represented in the exposure data 116. It should be apparent that the exposure data 116 can include any ad tracking data, at any level or combination, and that exposure data 116 can include any PII. In accordance with one or more embodiments, the PII in the conversion and/or exposure data can be aggregated for all or some of the users to provide group-level demographic, geographic, etc. information.

In accordance with one or more embodiments, the exposure and PII data 116 is forwarded to a first trusted third party, e.g., a marketing services provider such as without limitation a credit services entity or other entity, which uses an identifier, or identifiers, associated with the PII to generate first and second tokens, and creates a mapping, e.g., between two or more of the PII data, first token data and second token data. It should be apparent that this functionality can be provided by any entity, including the entity that generates the data 116. Using a trusted third party, e.g., either or both of the first and second trusted third parties, that is separate from another entity limits access to the encryption used to generate a token, thereby providing additional privacy protection. By way of a non-limiting example, a separate trusted third party can minimize the possibility of converting a token, e.g., by "reverse engineering" the token, to obtain the identifier associated with the PII. Additionally, a trusted third party that is a credit service can maintain a history of PII data, e.g., historical PII data. The historical PII data can be used in reconciling different PII data for a given user in connection with exposure data and/or conversion data. By way of a non-limiting example, the historical PII data can be used in identifying a correlation between user records in the exposure data and/or conversion data by matching current PII data associated with one record, e.g., an exposure data record or a conversion data record, with less current PII data used in another record, e.g., an exposure data record or a conversion data record.

Figure 2:
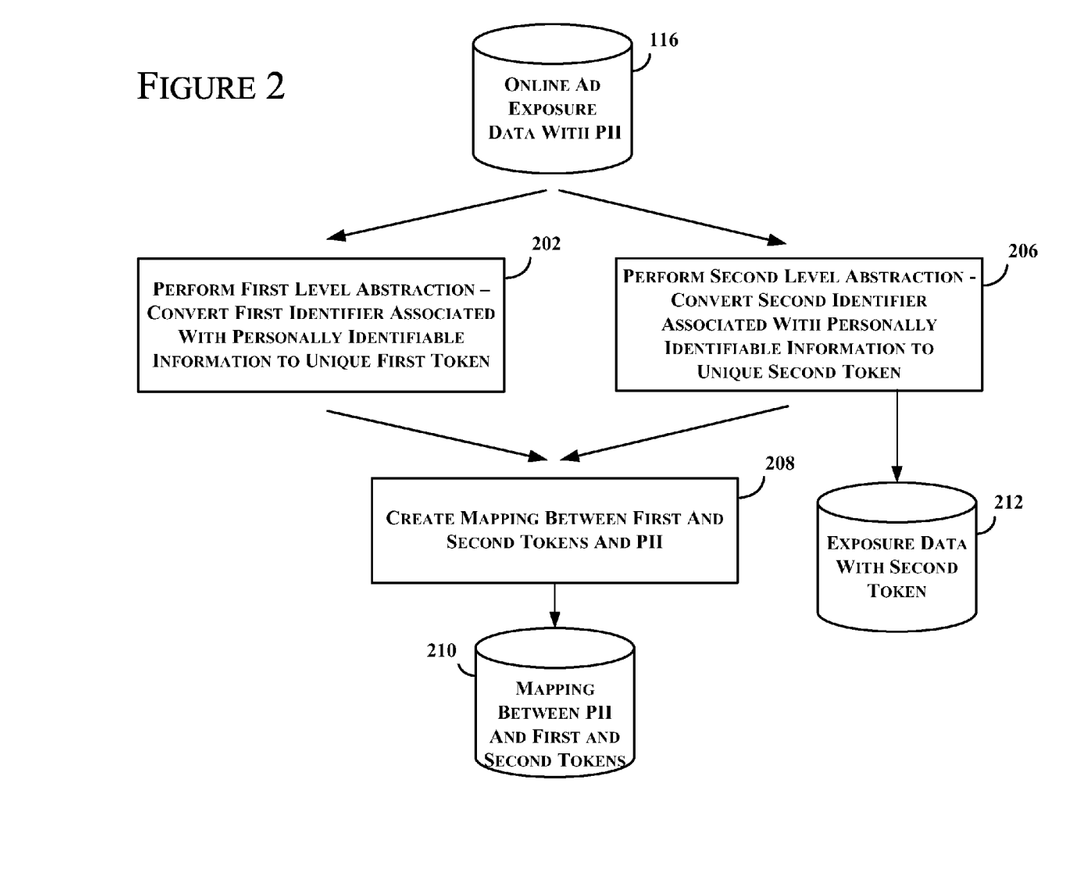
FIG. 2 provides an example of exposure data processing in accordance with one or more embodiments of the present disclosure.

FIG. 2 provides an example of exposure data processing in accordance with one or more embodiments of the present disclosure. Exposure data 116, which includes PII, is used in step 202, which performs a first level of abstraction using a first identifier associated with the PII to generate a first token. Each first token is unique for a given user relative to the first tokens of other users. As discussed herein, step 202 is performed using encryption, e.g., a first identifier associated with some or all of the PII is input to a first token generator that uses encryption, such as a hash function or another encryption function, to generate the first token. At step 206, a second identifier associated with some or all of the PII from exposure data 116, which can be the same or different PII used in step 202, is converted to a second token. Additionally, at step 206, exposure data 212 is generated and includes the second token. In contrast to exposure data 116, exposure data 212 uses the second token as anonymous user identification instead of, or in place of, the PII contained in exposure data 116. The first and second tokens generated in steps 202 and 206, respectively, are input to step 208 to create a mapping 210, e.g., between two or more of the PII, first token and second token data. By way of one non-limiting example, the mapping 210 can map the PII data, the first token generated from the identifier associated with the PII and the second token generated from identifier associated with the PII. The mapping 210 can be used as a lookup table. By way of a non-limiting example, in a case that the mapping 210 includes the PII, instead of regenerating the first token and/or the second token, given the PII, the mapping 210 can be used to determine the first token and/or the second token. Additionally, in a case that the mapping 210 includes a mapping between the first and second tokens, given either the first or second token, the mapping 210 can be used to determine the other token rather than regenerating the other token.

In accordance with one or more embodiments, step 206 makes use of encryption, e.g., encryption provided by a second token generator, of a second trusted third party. In accordance with one or more such embodiments, the first trusted third party is a trusted third party associated with the online data aggregation entity and the second trusted third party is a trusted third party of the offline data aggregation entity. By way of a non-limiting example, the second trusted third party can be an entity such as a data management provider or other entity, and the offline data aggregation entity can be an entity such as a marketing analytics provider or other entity. Of course it should be apparent that embodiments of the present disclosure are not limited to any specific online entity, offline entity and/or trusted third party. Additionally, it should be apparent that the offline entity and the second trusted third party can be the same. As discussed above, maintaining a separation between the online, or offline, entity and the trusted third party facilitates enhanced privacy protection.

Figure 3:
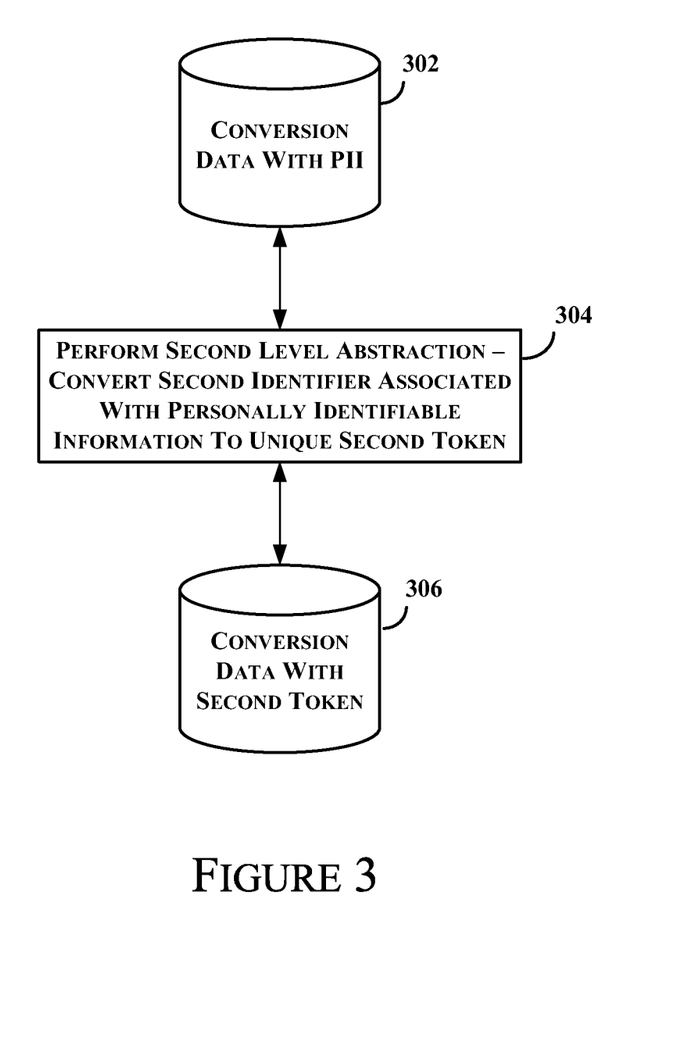
FIG. 3 provides an example of conversion data processing in accordance with one or more embodiments of the present disclosure.

In accordance with one or more embodiments, data from offline sales transactions is collected, e.g., by an offline entity such as a brick and mortar sales entity. Like exposure data 116, conversion data 302 includes PII. Conversion data 302 can comprise one or more point-of-sale sales transaction records, each corresponding to a sales transaction and comprises personally identifiable information for the user, or customer, involved in the sales transaction. FIG. 3 provides an example of conversion data processing in accordance with one or more embodiments of the present disclosure.

At step 304, the identifier linked to the PII data associated with one or more records in conversion data 302 is converted to a second token, and the PII data is replaced by the second token generated using the identifier linked to the PII data. The result of step 304 is conversion data with second token 306. Step 304 can be performed on a single transaction or multiple transactions. In accordance with one or more embodiments, step 304 is performed using encryption, e.g., by a second token generator of the second trusted third party.

In accordance with one or more embodiments, an offline aggregator aggregates exposure data 212 and conversion data 306, matching records using the second tokens. The aggregated data is used to create test and control populations, and one or more metrics are computed using the exposure data 212, conversion data 306, test population and control population. The metrics can be analyzed to provide insight into the impact of the ad campaign on online sales, and are useful in specifying a subsequent ad campaign.

Figure 4:
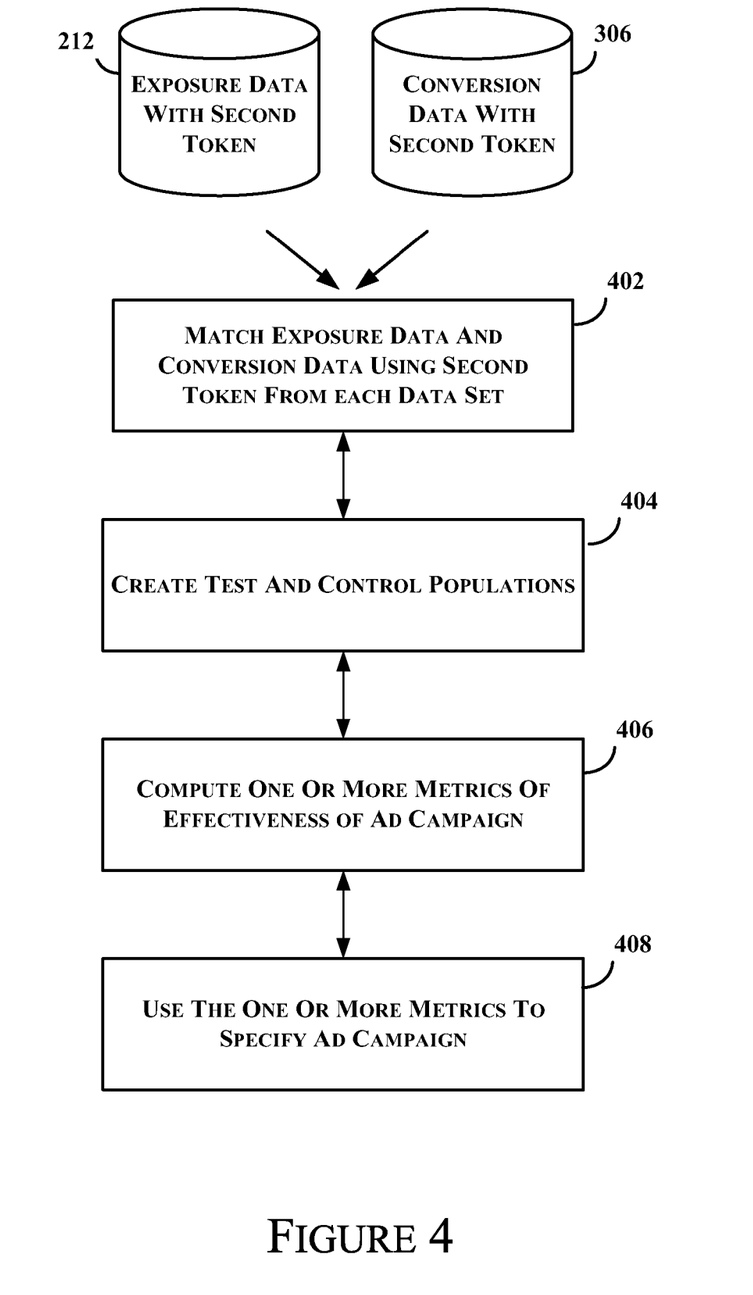
FIG. 4 provides an example of a flow in analysis of online ad campaign effectiveness using offline conversion data in accordance with one or more embodiments of the present disclosure.

FIG. 4 provides an example of a flow in analysis of online ad campaign effectiveness using offline conversion data in accordance with one or more embodiments of the present disclosure. In accordance with one or more embodiments, the flow can be performed by an offline data aggregator. Exposure data 212 and conversion data 306 are input to step 402, which aggregates the data and matches records in the data using the second tokens in each data set. At step 404, test and control populations are identified. At step 406, one or more effectiveness metrics are computed for the online ad campaign. By way of some non-limiting examples, metrics that measure conversion, or completed sales, retention of existing customers, acquisition of new customers and return on investment, etc. can be used to gauge the effectiveness of the online ad campaign. It should be apparent that any metrics now known or later developed can be used with embodiments of the present disclosure. At step 408, the one or more metrics computed at step 406 can be analyzed to determine the effectiveness of the online ad campaign, and/or to identify parameters and/or specifications for another online ad campaign. By way of one non-limiting example, an online ad campaign's effectiveness can be used to determine parameters of a new ad campaign, including without limitation ad budget, pricing of each advertisement in the new ad campaign, cost per view, cost per click, etc.

In accordance with one or more embodiments, an entity, or entities, that collects the exposure data causes the exposure data to be processed to remove the PII from the exposure data and replaced with the second token, and causes the first and second tokens to be generated using an identifier, or identifiers, associated with the PII. In accordance with one or more such embodiments, the exposure data collection entity, or entities, can send one or more requests to cause the first trusted third party to process the exposure data with PII 116, generate the tokens, create the mapping 210, and provide the exposure data 212, which includes the second token in place of the PII, to the offline aggregator.

Figure 5:
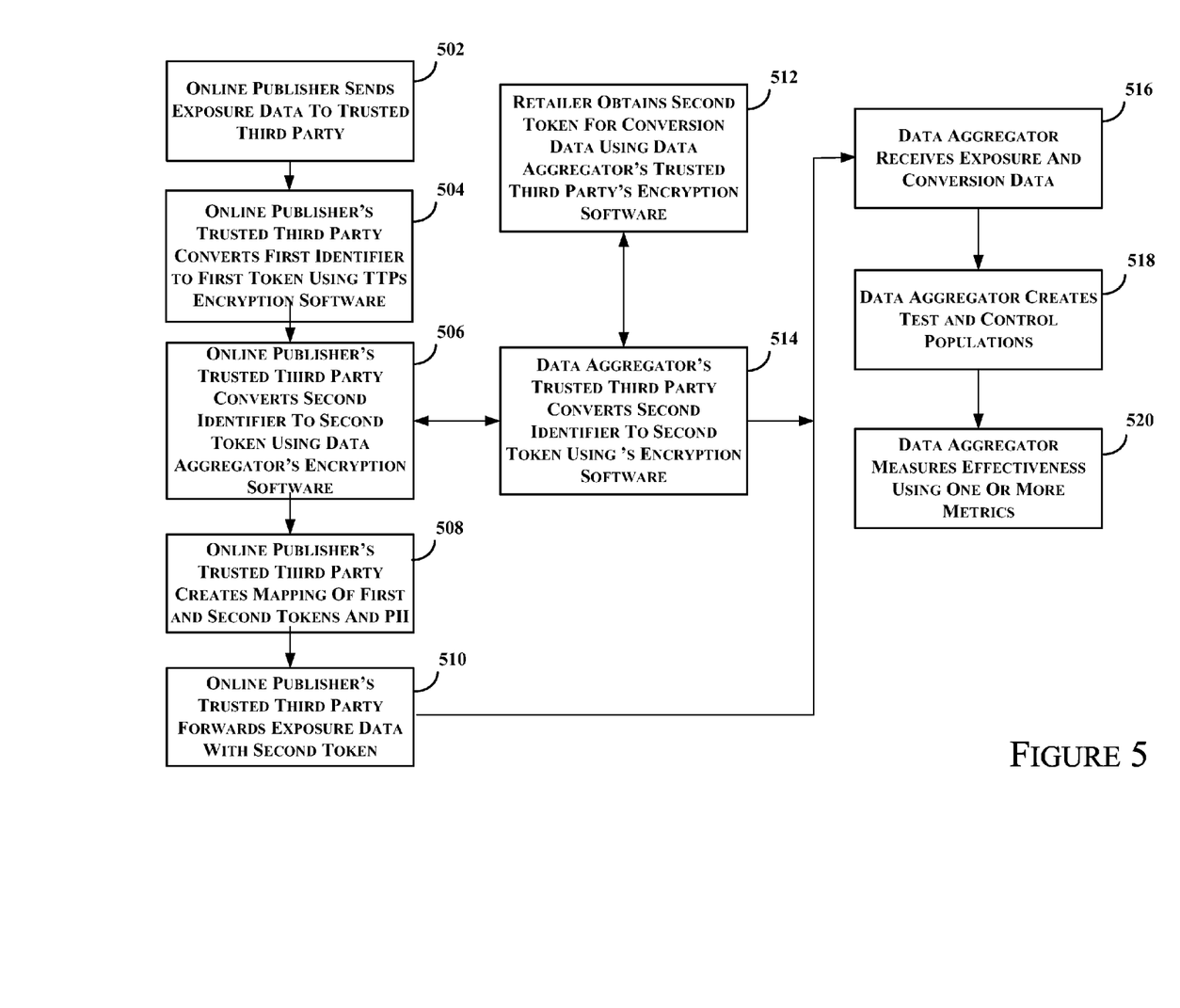
FIG. 5 provides a flow in accordance with one or more embodiments of the present disclosure.

FIG. 5 provides a flow in accordance with one or more embodiments of the present disclosure. At step 502, an entity that collects the exposure data, the online publisher in this example, sends the exposure data in a request to the first trusted third party, and causes a first trusted third party to perform steps 504, 506, 508, 510 in response. At step 504, the first trusted third party uses an identifier associated with some or all of the PII to generate the first token using the first trusted third party's encryption module. In further response to the request, the first trusted third party uses an identifier associated with some or all of the PII to generate the second token using a second trusted third party's encryption module, at step 506. In accordance with one or more embodiments, in response to the request, at step 508, the first trusted third party can create a mapping 210. The first trusted third party replaces the PII with the second token in the exposure data 212, and forwards the exposure data 212 to a data aggregator, at step 510.

At step 512, one or more retailers collect offline sales transaction data with PII, and send a request to a second trusted third party to generate a second token using an identifier associated with some or all of the PII from the sales transaction data, replace the PII with the second token, and forward the offline sales transaction data to the data aggregator, at step 514. The mapping between first and second tokens and PII can be used to match the PII in the conversion data with the PII in the mapping to identify the second token.

In response to receiving the exposure data of the online entity, and the conversion data of the offline entity, at step 516, the data aggregator analyzes the received data to determine the effectiveness of the online advertising on the offline sales by matching the second token of a given user contained in the exposure and conversion data. At step 518, the data aggregator creates test and control populations, and at step 520 the data aggregator uses one or more metrics to measure effectiveness of the online advertising, e.g., the data aggregator uses a plurality of metrics and measures effectiveness across the plurality of metrics.

Figure 6:
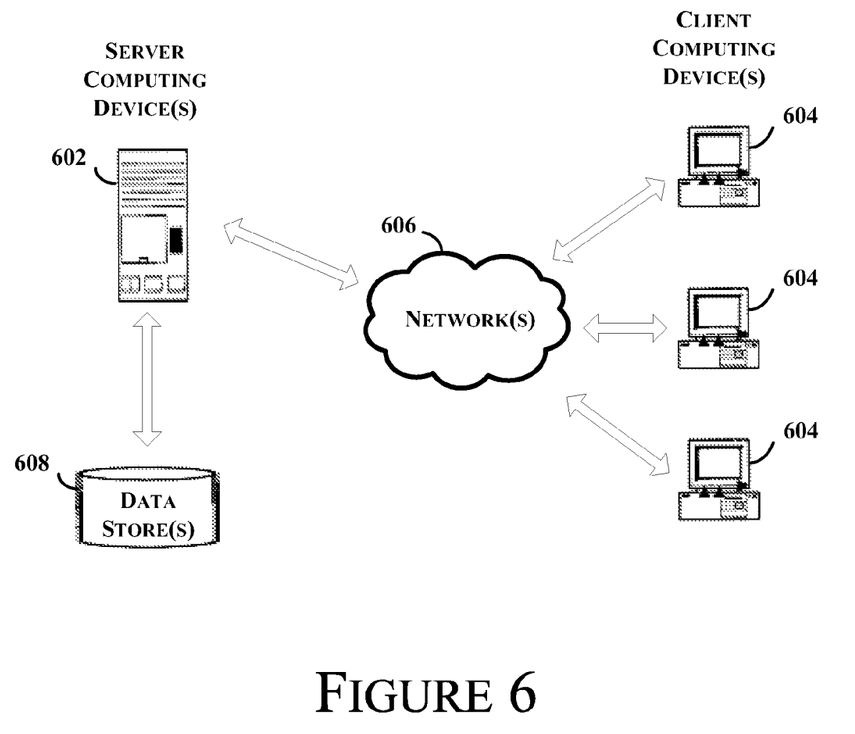
FIG. 6 illustrates some components that can be used in connection with one or more embodiments of the present disclosure.

FIG. 6 illustrates some components that can be used in connection with one or more embodiments of the present disclosure. In accordance with one or more embodiments of the present disclosure, one or more computing devices, e.g., one or more server computing devices 602 and client computing devices 604 are configured to comprise functionality described herein. By way of some non-limiting examples, server computing device 602 can be web server 102, ad server 106, online data aggregation computing device 114, the first trusted third party's computing device, and/or the second trusted third party's computing device. By way of some further non-limiting examples, client computing device 604 can be user computing device 112, online data aggregation computing device 114, a computing device of the first trusted third party's computing device, a computing device of the second trusted third party, etc. In accordance with one or more embodiments, a server computing device 602 can act as a client computing device 604. By way of one non-limiting example, the first trusted third party's server computing device can act as a client computing device 604 in requesting a second token from the second trusted third party's server computing device.

By way of a non-limiting example, as discussed herein, web server 102 and/or ad server 106, as computing device 602, can serve content to user computing device 112, as client computing device 604, using a browser application via a network, such as network 110 and/or network 606. A server computing device 602 is coupled to one or more data stores 608. By way of some non-limiting examples, data store 608 can be user database(s) 104, ad database(s) 108, online ad exposure data with PII 116, mapping 210, exposure data with second token 212, conversion data with PII 302, conversion data with second token 306, as well as other data, including program code to configure server 602 to execute the functionality discussed herein in accordance with one or more embodiments.

The client computing device 604 can be any computing device, including without limitation a personal computer, personal digital assistant (PDA), wireless device, cell phone, internet appliance, media player, home theater system, and media center, or the like.

For the purposes of this disclosure, a computing device includes at least one processor for executing and memory for storing program code. The computing device may be provided with an operating system that allows the execution of software applications in order to manipulate data. Additionally, computing device such as server 602 and client computing device 604 can include a removable media reader, network interface, display and interface, and one or more input devices, e.g., keyboard, keypad, mouse, etc. and input device interface, for example. One skilled in the art will recognize that server 602 and client computing device 604 may be configured in many different ways and implemented using many different combinations of hardware, software, or firmware.

In accordance with one or more embodiments, a server computing device 602 can make a user interface available to a client computing device 604 via the network 606. The user interface made available to the client computing device 604 can include one or more pages of content, the content can include one or more advertisements of an ad campaign. In accordance with one or more embodiments, computing device 602 makes a user interface available to a client computing device 604 by communicating a definition of the user interface to the client computing device 604 via the network 606. The user interface definition can be specified using any of a number of languages, including without limitation a markup language such as Hypertext Markup Language, scripts, applets and the like. The user interface definition can be processed by an application executing on the client computing device 604, such as a browser application, to output the user interface on a display coupled, e.g., a display directly or indirectly connected, to the client computing device 604.

In at least one embodiment, the network 606, or network 110, may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

It should be apparent that embodiments of the present disclosure can be implemented in a client-server environment such as that shown in FIG. 6. Alternatively, embodiments of the present disclosure can be implemented other environments, e.g., a peer-to-peer environment as one non-limiting example.

Figure 7:
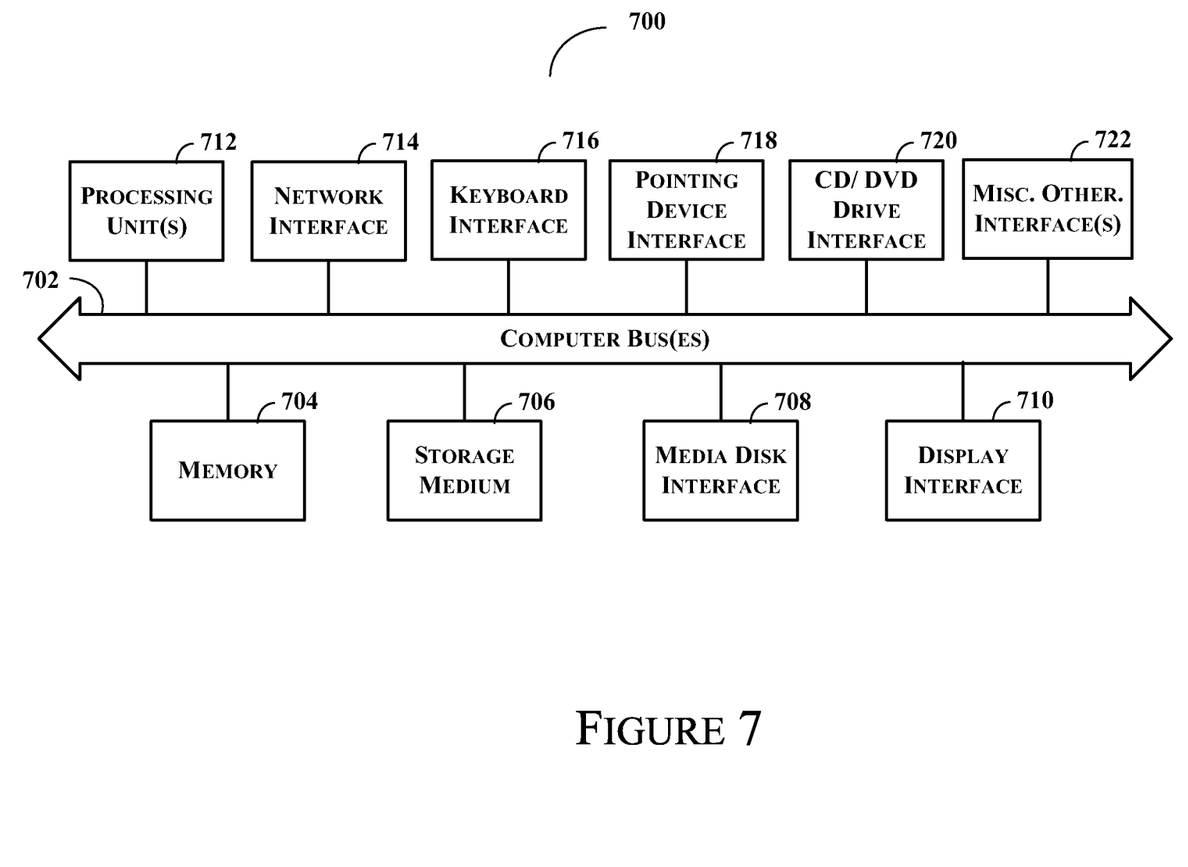
FIG. 7 provides is a detailed block diagram illustrating one example of an internal architecture of a computing device in accordance with one or more embodiments of the present disclosure.

FIG. 7 is a detailed block diagram illustrating an internal architecture of a computing device, e.g., a computing device such as server 702 or user computer 704, in accordance with one or more embodiments of the present disclosure. As shown in FIG. 7, internal architecture 700 includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), etc., media disk drive interface 708 as an interface for a drive that can read and/or write to media including removable media such as floppy, CD-ROM, DVD, etc. media, display interface 710 as interface for a monitor or other display device, keyboard interface 716 as interface for a keyboard, pointing device interface 718 as an interface for a mouse or other pointing device, and miscellaneous other interfaces not shown individually, such as parallel and serial port interfaces, a universal serial bus (USB) interface, and the like.

Memory 704 interfaces with computer bus 702 so as to provide information stored in memory 704 to CPU 712 during execution of software programs such as an operating system, application programs, device drivers, and software modules that comprise program code, and/or computer-executable process steps, incorporating functionality described herein, e.g., one or more of process flows described herein. CPU 712 first loads computer-executable process steps from storage, e.g., memory 704, computer-readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:

maintaining, by at least one computing device, a user data store for each of a plurality of users, each user data store storing personally identifiable information about a corresponding user, the corresponding user's personally identifiable information, the user's personally identifiable information is non-anonymous information identifying the user that is associated with a unique identifier that uniquely identifies the user in ad tracking data;

collecting, by the at least one computing device, the ad tracking data for each advertisement served to the plurality of users in connection with an online advertisement campaign;

generating, by the at least one computing device, ad exposure data using the ad tracking data, the exposure data including at least a portion of the personally identifiable information for each user of the plurality;

causing, by the at least one computing device, a unique first token to be generated as a first anonymous identifier using a first identifier associated with the personally identifiable information included in the exposure data for each user of the plurality, each unique first token being a first level of abstraction of the corresponding user's personally identifiable information included in the exposure data and uniquely identifying the corresponding user;

causing, by the at least one computing device, a unique second token to be generated as a second anonymous identifier using a second identifier associated with the personally identifiable information included in the exposure data for each user of the plurality, each unique second token being a second level of abstraction of the corresponding user's personally identifiable information included in the exposure data and uniquely identifying the corresponding user; and causing, by the at least one computing device, each user's personally identifiable information in the exposure data to be replaced with the user's corresponding unique second token, the unique second token used to identify the corresponding user's exposure to the online ad campaign and to identify sales transactions of the corresponding user in offline sales transaction data in measuring effectiveness of the online advertisement campaign using the exposure and offline sales transaction data.

2. The method of claim 1, causing a unique first token to be generated further comprising:

making a request, by the at least one computing device to a trusted third party, to generate the unique first token using the first identifier associated with the personally identifiable information included in the exposure data for each user of the plurality.

3. The method of claim 1, causing a unique second token to be generated further comprising:

making a request, by the at least one computing device to a trusted third party, to generate the unique second token using the second identifier associated with the personally identifiable information included in the exposure data for each user of the plurality.

4. The method of claim 1, wherein the second identifier is the unique first token.

5. The method of claim 1, wherein a first trusted third party is used to generate the unique first token and a second trusted third party different from the first trusted third party is used to generate the unique second token.

6. The method of claim 1, further comprising:

causing, by the at least one computing device, creation of a mapping between each user's unique first and second tokens.

7. The method of claim 1, further comprising:

causing, by the at least one computing device, creation of a mapping between each user's personally identifiable information, and the user's unique first and second tokens.

8. A system comprising:

at least one processor and memory, the memory storing instructions that when executed by the at least one processor cause the at least one processor to:

maintain a user data store for each of a plurality of users, each user data store storing personally identifiable information about a corresponding user, the corresponding user's personally identifiable information, the user's personally identifiable information is non-anonymous information identifying the user that is associated with a unique identifier that uniquely identifies the user in ad tracking data;

collect the ad tracking data for each advertisement served to the plurality of users in connection with an online advertisement campaign;

generate ad exposure data using the ad tracking data, the exposure data including at least a portion of the personally identifiable information for each user of the plurality;

cause a unique first token to be generated as an anonymous identifier using a first identifier associated with the personally identifiable information included in the exposure data for each user of the plurality, each unique first token being a first level of abstraction of the corresponding user's personally identifiable information included in the exposure data and uniquely identifying the corresponding user;

cause a unique second token to be generated as an anonymous identifier using a second identifier associated with the personally identifiable information included in the exposure data for each user of the plurality, each unique second token being a second level of abstraction of the corresponding user's personally identifiable information included in the exposure data and uniquely identifying the corresponding user; and cause each user's personally identifiable information in the exposure data to be replaced with the user's corresponding unique second token, the unique second token used to identify the corresponding user's exposure to the online ad campaign and to identify sales transactions of the corresponding user in offline sales transaction data in measuring effectiveness of the online advertisement campaign using the exposure and offline sales transaction data.

9. The system of claim 8, the instructions to cause a unique first token to be generated further comprising instructions to:

make a request, to a trusted third party, to generate the unique first token using the first identifier associated with the personally identifiable information included in the exposure data for each user of the plurality.

10. The system of claim 8, the instructions to cause a unique second token to be generated further comprising instructions to:

make a request, to a trusted third party, to generate the unique second token using the second identifier associated with the personally identifiable information included in the exposure data for each user of the plurality.

11. The system of claim 8, wherein the second identifier is the unique first token.

12. The system of claim 8, wherein a first trusted third party is used to generate the unique first token and a second trusted third party different from the first trusted third party is used to generate the unique second token.

13. The system of claim 8, the instructions further comprising instructions to:

cause creation of a mapping between each user's personally identifiable information, and the user's unique first and second tokens.

14. A non-transitory computer readable storage medium for tangibly storing thereon computer readable instructions that when executed cause at least one processor to:

maintain a user data store for each of a plurality of users, each user data store storing personally identifiable information about a corresponding user, the corresponding user's personally identifiable information, the user's personally identifiable information is non-anonymous information identifying the user that is associated with a unique identifier that uniquely identifies the user in ad tracking data;

collect the ad tracking data for each advertisement served to the plurality of users in connection with an online advertisement campaign;

generate ad exposure data using the ad tracking data, the exposure data including at least a portion of the personally identifiable information for each user of the plurality;

cause a unique first token to be generated as an anonymous identifier using a first identifier associated with the personally identifiable information included in the exposure data for each user of the plurality, each unique first token being a first level of abstraction of the corresponding user's personally identifiable information included in the exposure data and uniquely identifying the corresponding user;

cause a unique second token to be generated as an anonymous identifier using a second identifier associated with the personally identifiable information included in the exposure data for each user of the plurality, each unique second token being a second level of abstraction of the corresponding user's personally identifiable information included in the exposure data and uniquely identifying the corresponding user; and cause each user's personally identifiable information in the exposure data to be replaced with the user's corresponding unique second token, the unique second token used to identify the corresponding user's exposure to the online ad campaign and to identify sales transactions of the corresponding user in offline sales transaction data in measuring effectiveness of the online advertisement campaign using the exposure and offline sales transaction data.

15. The medium of claim 14, the instructions to cause a unique first token to be generated further comprising instructions to:

make a request, to a trusted third party, to generate the unique first token using the first identifier associated with the personally identifiable information included in the exposure data for each user of the plurality.

16. The medium of claim 14, the instructions to cause a unique second token to be generated further comprising instructions to:

make a request, to a trusted third party, to generate the unique second token using the second identifier associated with the personally identifiable information included in the exposure data for each user of the plurality.

17. The medium of claim 14, wherein the second identifier is the unique first token.

18. The medium of claim 14, wherein a first trusted third party is used to generate the unique first token and a second trusted third party different from the first trusted third party is used to generate the unique second token.

19. The medium of claim 14, the instructions further comprising instructions to:

cause creation of a mapping between each user's personally identifiable information, and the user's unique first and second tokens.

* * * * *